United States Patent

Miller

Patent Number: 5,119,524
Date of Patent: Jun. 9, 1992

[54] SINGLE WIPER WITH SUPPLEMENTAL WIPE PATTERN

[75] Inventor: Larry D. Miller, Rochester Hills, Mich.

[73] Assignee: Geenral Motors Corporation, Detroit, Mich.

[21] Appl. No.: 702,860

[22] Filed: May 20, 1991

[51] Int. Cl.⁵ .............................................. B60S 1/32
[52] U.S. Cl. .............................. 15/250.23; 15/250.35
[58] Field of Search ........... 15/250.23, 250.27, 250.14, 15/250.21, 250.30, 250.33, 250.13, 250.39, 250.35

[56] References Cited

U.S. PATENT DOCUMENTS

| | | | |
|---|---|---|---|
| 1,694,245 | 12/1928 | Baker et al. | 15/250.23 |
| 2,644,187 | 11/1947 | Lacy | 15/250.23 |
| 2,787,018 | 4/1957 | Smith | 15/250.23 |
| 2,973,542 | 3/1961 | Horton | 15/250.23 |
| 3,418,678 | 12/1968 | Deibel et al. | 15/250.23 |
| 3,551,938 | 1/1971 | Yonke | 15/150.23 |
| 4,630,327 | 12/1986 | Schmidt et al. | 15/250.21 |
| 4,641,390 | 2/1987 | Michalke | 15/250.23 |
| 4,707,876 | 11/1987 | Carducci | 15/250.23 |
| 4,912,802 | 4/1990 | Raymond | 15/250.27 |

FOREIGN PATENT DOCUMENTS

| | | | |
|---|---|---|---|
| 55429 | 11/1938 | Denmark | 15/250.23 |
| 0319488 | 6/1989 | European Pat. Off. | 15/250.23 |
| 1907386 | 9/1970 | Fed. Rep. of Germany | 15/250.23 |
| 2354804 | 5/1975 | Fed. Rep. of Germany | 15/250.23 |
| 340109 | 12/1930 | United Kingdom | 15/250.23 |

Primary Examiner—Harvey C. Hornsby
Assistant Examiner—Gary K. Graham
Attorney, Agent, or Firm—Patrick M. Griffin

[57] ABSTRACT

A single wiper mounted to a conventionally located, non-center wiper post is adapted to wipe a generally rectangular windshield. A primary arm and wiper blade are long enough to cover a main wipe pattern that covers most of the driver side of the windshield. A secondary arm and blade pivoted to the tip of the primary arm are continously pivoted by a drag link over a supplemental wipe pattern that covers the residual area on the passenger side. The width of the supplemental pattern remains relatively great until the secondary blade comes close to the windshield upper edge, where it is retracted to avoid collision.

1 Claim, 3 Drawing Sheets

SINGLE WIPER WITH SUPPLEMENTAL WIPE PATTERN

This invention relates to vehicle windshield wipers in general, and specifically to a single, non-center mounted wiper that creates a supplemental wipe pattern outboard of its main wipe pattern.

BACKGROUND OF THE INVENTION

Vehicle windshields have a surface area that is generally rectangular, with equal length side edges and a lower and upper edge that meet at four corners. As windshields are sloped back ever farther from the vertical, their length increases significantly, as measured along the windshield surface from the lower edge to the upper edge. They are still generally wider, measured side to side, than they are long, however. Federal standards provide a formula to calculate the amount of surface area of any windshield that must be wiped, and the degree to which it must be wiped. In general, the area most directly in front of the driver's field of vision must be more thoroughly wiped.

Ideally, single wiper systems would be preferred, for the simple reason that they have but one wiper arm and blade. No measures have to be taken to prevent wiper collision, as with two wiper systems. Known single wiper systems center mount the wiper arm to a single wiper post so as to sweep back and forth over the windshield. However, an axial telescoping motion has to be superimposed on the arm as it sweeps in order to reach far enough out into the upper windshield corners. The wiper blade is pushed out into the upper corners and pulled back with each wipe cycle. The mechanical systems that achieve this are heavy, expensive and complex, removing much of the inherent advantage of a single wiper. Another known system uses a hinged tip section at the end of the center mounted primary arm that is supposed to be pivoted back and forth by the surface friction of the windshield, causing it to describe an outer arc concentric to the main arc. Windshield surface friction is extremely variable and unpredictable, however, so such a system is not considered practical.

Another factor inhibiting the adoption of single arm systems is the fact that in most wiper drive systems the wiper posts are currently set up with two wiper arm mounting posts, each journaled to the vehicle body near a lower corner of the windshield. Most known single wiper systems, as noted above, use a center mounted wiper post. Retro fitting such single arm systems to pre existing vehicles would be impractical. Consequently, almost all commercially available systems continue to use two wipers, often with overlapping wipe patterns. Matching two wiper systems to more radically raked windshields, and avoiding collision of increasingly longer arms, is a continuing design challenge.

SUMMARY OF THE INVENTION

The invention provides a single wiper system that can be mounted to a single, conventionally located wiper post, but which wipes sufficient area of the windshield.

In the preferred embodiment, the wiper post is journaled to the vehicle body along the lower edge of the windshield, near the lower driver side corner of the windshield. The wiper post oscillates over an angle sufficient to cover the angle subtended by the windshield corner that it is near. A primary wiper arm fixed to the wiper post carries a primary wiper blade that has an effective length sufficient to reach into the upper driver side corner of the windshield. Consequently, as the wiper post oscillates, the primary wiper arm and blade describe a main wipe pattern with an inwipe position nearly parallel to the windshield lower edge and an outwipe position nearly parallel to the side edge. The driver side of the windshield is well covered, up close to the upper corner. However, given the fact that the windshield is wider than it is long, the primary blade misses the passenger side windshield corners, leaving a substantial residual area on the passenger side unwiped.

To catch the residual area, a secondary arm is pivoted near the end of the primary arm. The secondary arm carries a secondary blade that has an effective length substantially equal to the differential between the primary blade and the windshield lower edge. As the primary blade moves up from inwipe to outwipe, a drag link connected between the vehicle body and secondary arm simultaneously pulls the secondary blade down from an extended position nearly collinear to the primary blade to a retracted position nearly perpendicular. Consequently, the secondary blade covers a supplemental wipe pattern outboard of the main wipe pattern, which has the shape of an annular segment of gradually decreasing width. The secondary blade reaches almost to the passenger side lower corner, comes closer to the passenger side upper corner, but retracts sufficiently to miss the upper windshield edge. Therefore, the residual area of the passenger side is adequately wiped. The single wiper system can be easily retro-fitted to existing vehicle bodies, because of the conventional location and operation of the wiper post.

It is, therefore, an object of the invention to provide a single wiper system that can wipe sufficient area of the windshield with a conventionally located wiper post.

It is another object of the invention to provide such a single wiper comprised of a longer primary arm and blade that wipes most of the driver side of the windshield, and a secondary arm and blade that is positively pivoted relative to the primary arm over a supplemental wipe pattern that covers enough of the residual passenger side area of the windshield.

DESCRIPTION OF THE PREFERRED EMBODIMENT

These and other objects and features of the invention will appear from the following written description, and from the drawings, in which.

Figure 1:
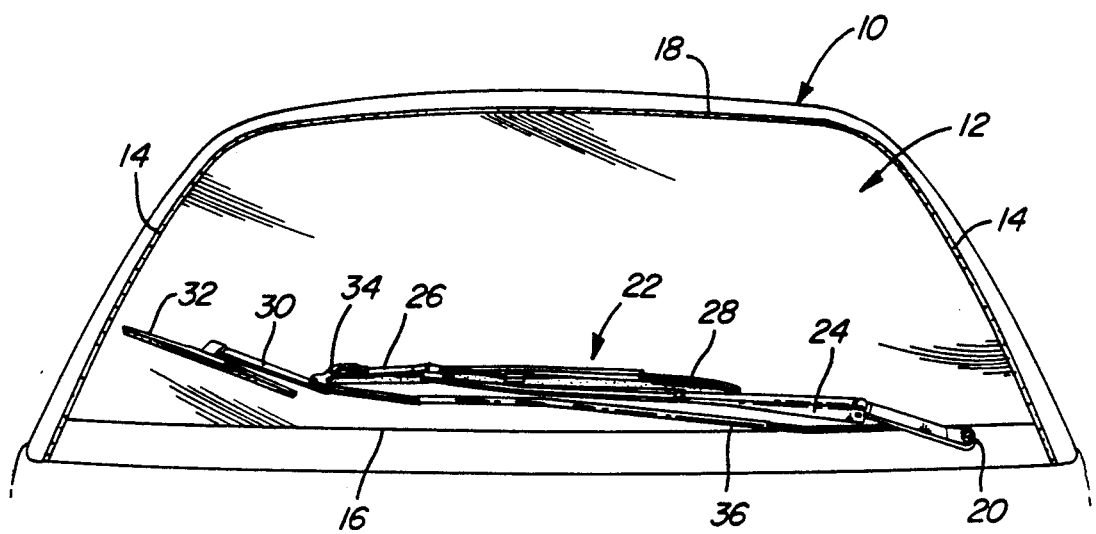
FIG. 1 is a front view of a vehicle body and windshield, from a horizontal perspective, showing a preferred embodiment of the wiper system of the invention.
Figure 3:
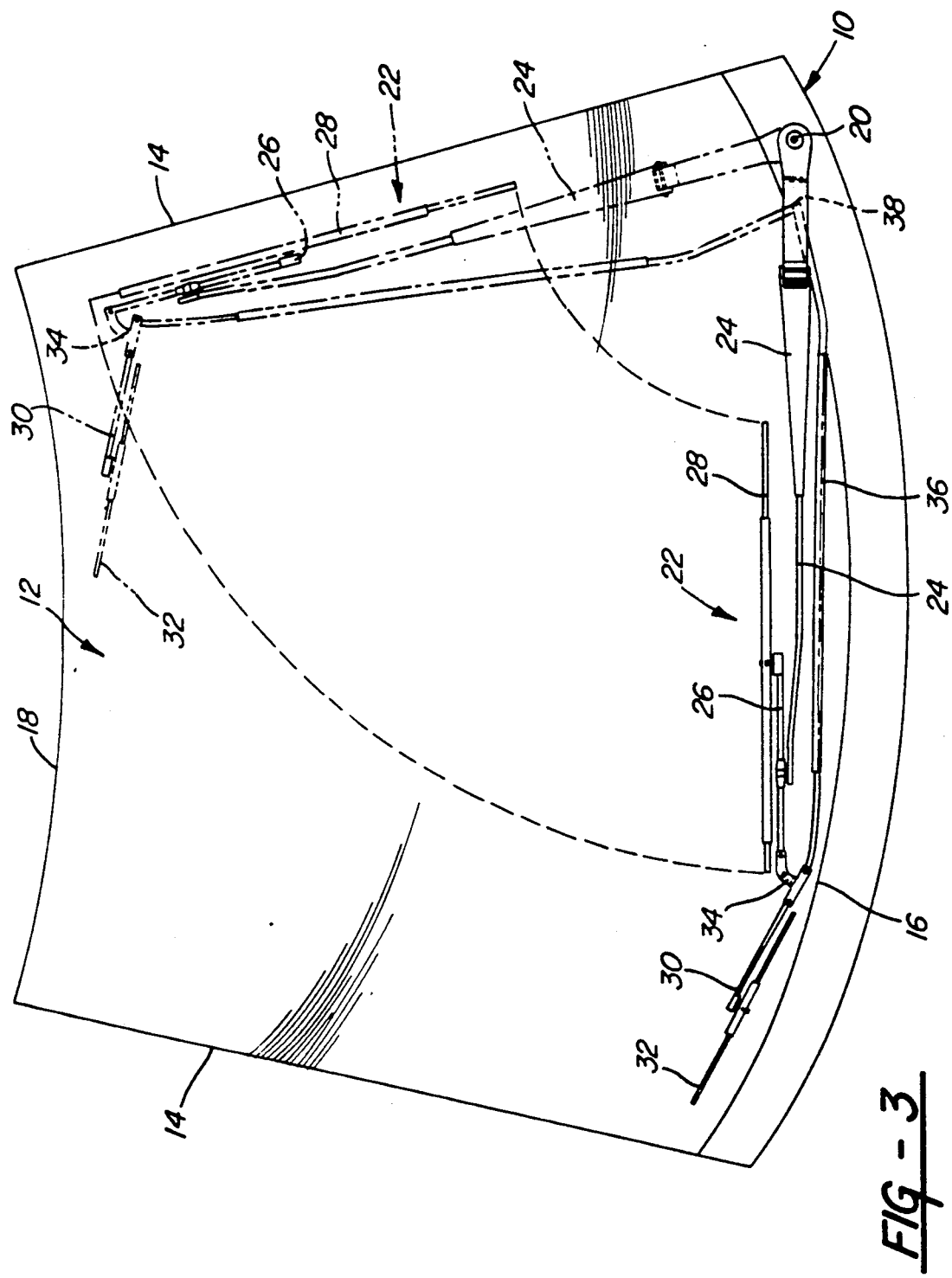
FIG. 3 is a view of just the windshield, from a perspective perpendicular to the windshield, showing the inwipe position in solid and the outwipe position in dotted lines.

Referring first to FIGS. 1 and 3, a vehicle body 10 has a generally rectangular windshield, indicated generally at 12. By generally rectangular, it is meant that windshield 12 has a pair of same length, generally parallel side edges 14 and generally parallel lower and upper edge 16 and 18. The four edges intersect at corners that are substantially perpendicular. The actual shape is more nearly trapezoidal, since the side edges 14 are not perfectly parallel, nor are the corners perfectly perpendicular. Nor are the lower and upper edges 16 and 18 perfectly straight. Windshield 12 is also sloped sharply away from the vertical, and is not perfectly planar, since it curves down from the center to the sides. Therefore, an accurate idea of its shape can't be communicated just from the horizontally directed front view of FIG. 1. As seen in FIG. 3, which looks perpendicularly at windshield 12 to show it "flat," it is longer, as measured between the lower and upper edges 16 and 18, than would appear from FIG. 1. Still, even as viewed in FIG. 3, the generally rectangular profile holds, in that windshield 12 is wider, as measured between the side edges 14, than it is long. Vehicle body 10 also includes a conventional wiper post 20 journaled thereto along the windshield lower edge 16, relatively close to the driver side lower corner of windshield 12. A suitable drive motor would oscillate wiper post 20 back and forth over an angle generally equal to the angle subtended by lower edge 16 and side edge 14 together. A typical vehicle would have an identical wiper post in an equivalent location near the passenger side lower corner of windshield 12. It would be simple to eliminate or inactivate the other wiper post, which is what is done here.

Figure 2:
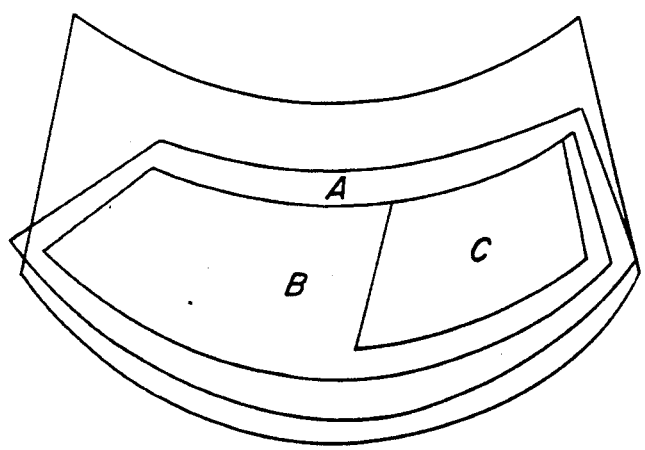
FIG. 2 is a schematic view of a windshield similar to that of FIG. 1, illustrating the required wipe areas.

Referring next to FIG. 2, the wiping task faced by the wiper system designer is defined by the Federal Motor Vehicle Safety Standards. The FMVSS standards calculate a set of three areas on a windshield, indicated at A, B and C, as well as strict percentages of those areas that must be wiped. The formulae by which the areas are calculated are a matter of public record, and need not be explained here. However, it is instructive to note that the wiping requirement is not symmetrical, but weighted toward one side, the driver side. The area C, most directly in front of the driver, must have 99% of its area wiped with every stroke, while area A need only have 80% wiped. Thus, a single, center mounted wiper that wiped symmetrically would actually overwipe the passenger side in order to adequately wipe the driver side. This is why some two wiper systems overlap the wipe patterns of the two wipers in an asymmetrical fashion, so as to give extra attention to the driver side. However, as the windshield becomes longer, so does wiper length, and collision avoidance in the overlap area becomes even more difficult.

Referring next to FIG. 3, the invention uses a single wiper, indicated generally at 22. Wiper 22 includes a primary arm 24 that is fixed to wiper post 20, and is thereby swept back and forth from the solid line position of FIG. 3 to the dotted line position. A shorter extension beam 26 is pinned near its center to the tip of primary arm 24. A primary wiper blade 28 is mounted near its center to the inboard end of extension beam 26. The pinned connection between primary arm 24 and extension beam 26 provides a degree of freedom for the primary blade perpendicular to endshield 12, but not parallel thereto. This allows wiper 22 to better conform to the curved surface, but the primary arm 24 and extension beam 26 still effectively move as one component in the direction parallel to the plane of windshield 12. The primary blade is shorter than side edge 14, but is mounted at a point that gives it an effective length nearly equal to side edge 14. That is, as primary arm 24 moves, primary blade 28 covers a pattern extending from an inwipe position parallel to lower edge 16, to an outwipe position parallel to side edge 14 and reaching close to the driver side upper corner of windshield 12. As shown by the dotted lines, the main wipe pattern created is an annular segment or arc that is wide enough to catch nearly all of area C. However, primary blade 28 does not come close to either the lower or upper corner of the passenger side of windshield 12.

Figure 4:
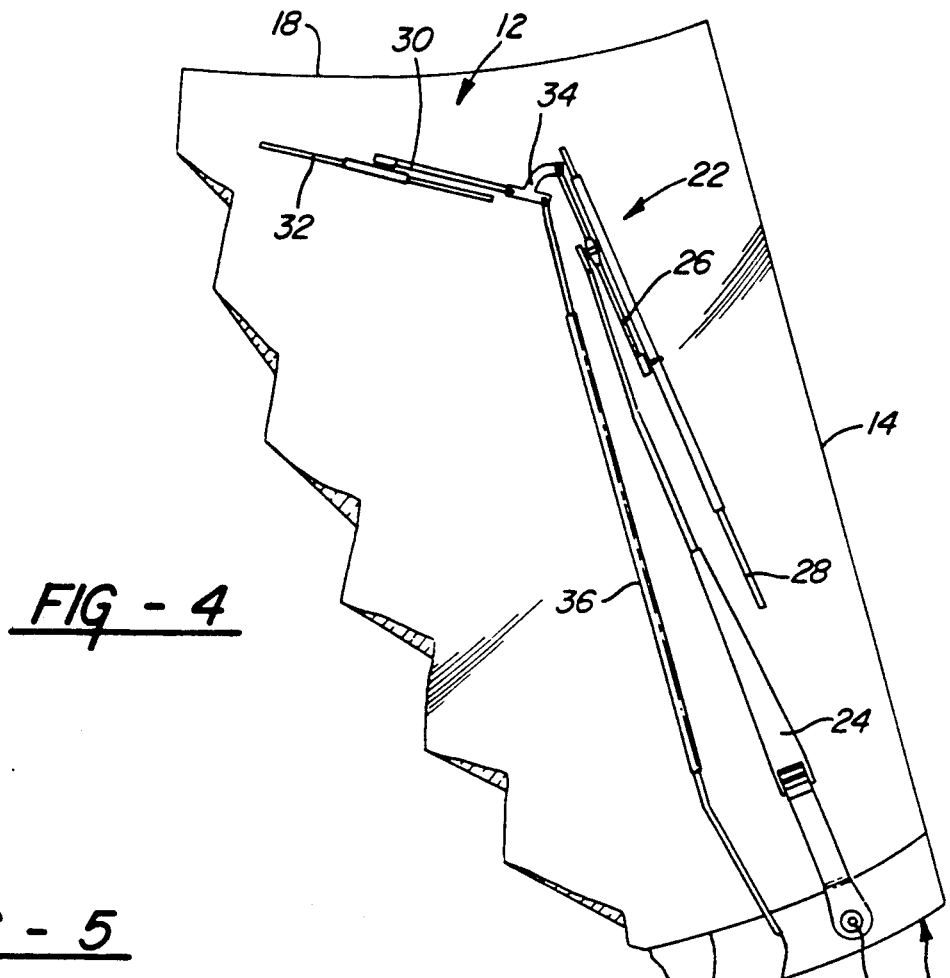
FIG. 4 is a view like FIG. 3, but showing just the driver side of the windshield and just the outwipe position.

Referring next to FIGS. 3 and 4, the residual area of windshield 12 missed by the main wipe pattern is covered by a secondary arm 30 and secondary blade 32. Secondary arm 30 is pivoted to the end of primary arm 24 by a bell crank 34, indirectly so, by pivoting one leg of bell crank 34 to the outboard end of extension beam 26. Secondary blade 32 is mounted near its center to the top of secondary arm 30 so as to have an effective length substantially equal to the difference between the effective length of primary blade 28 and the windshield lower edge 16. A drag link 36 is pivoted at one end to bell crank 34 and at the other end to vehicle body 10 at a pivot point 38 that is offset from wiper post 20. The offset between wiper post 20 and pivot point 38, and the size of bell crank 34, are arranged so as to create a pivoting action of secondary blade 32 relative to primary blade 28 as it sweeps back and forth. Specifically, when primary blade 28 is in the inwipe position of FIG. 3, the pivot point 38 is in line with primary arm 24 and the secondary blade 32 is nearly collinear with primary blade 28. Consequently, secondary blade 32 is also substantially parallel to the windshield lower edge 16, and reaches nearly into the passenger side lower corner. As primary arm 24 is moved up, drag link 36 acts to pull secondary arm 30 down and pivot secondary blade 32 continuously down. Eventually, when primary blade 28 reaches its outwipe position, secondary blade 32 has pivoted until it is nearly perpendicular, clearing windshield upper edge 18, as shown in FIG. 4.

Figure 5:
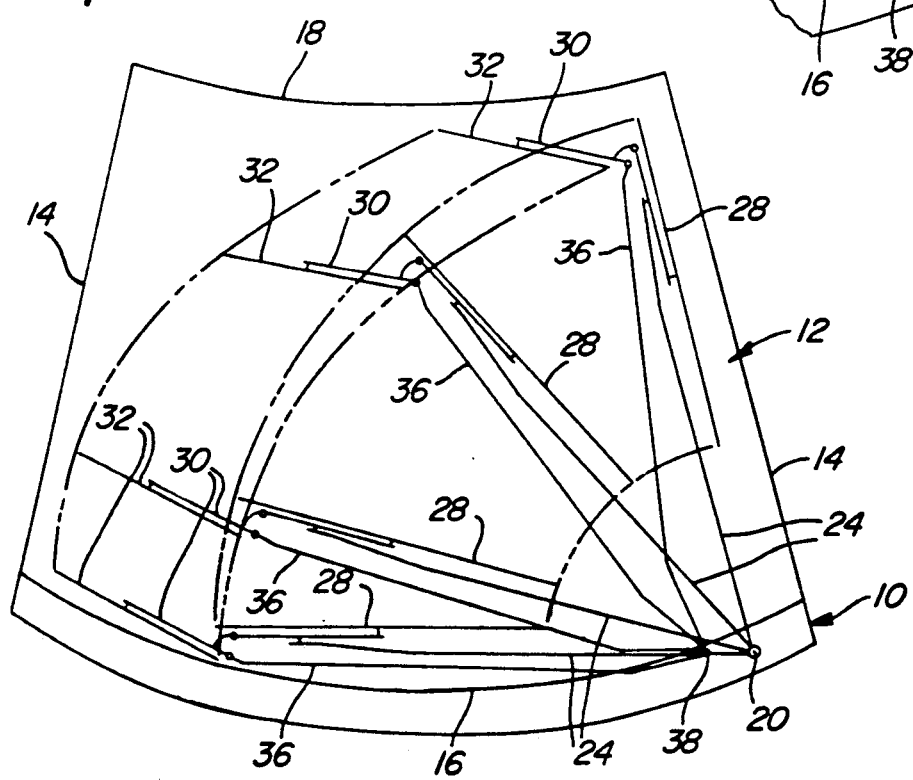
FIG. 5 is a schematic view showing various wiper positions over the extent of the entire wipe pattern.

Referring next to FIGS. 2 and 5, the total wiping effect of wiper 22 is illustrated. In FIG. 5, the operation of secondary blade 32 is illustrated schematically, along with the operation of primary blade 28. Although secondary blade 32 is pivoted continuously, the drag link 36 has a non-linear effect, because of the geometric relation of the wiper post 20-pivot point 38 offset to the arcuate path followed by primary arm 24. The amount that secondary blade 32 pivots is weighted more toward the outwipe position of primary blade 28, more toward the windshield upper edge 18 than the lower edge 16. Consequently, secondary blade 32 describes a supplemental wipe pattern outboard of the main wipe pattern that has the general shape of an annular segment. This supplemental annular segment is nearly as wide as the secondary blade 32 is long over most of its arc, and narrows significantly only toward the windshield upper edge 18. At that point, secondary blade 32 has to pivot down more to miss windshield upper edge 18. In describing its supplemental wipe pattern, secondary blade 32 covers much of the area of windshield 12 that primary blade 28 cannot, coming close to the passenger side lower corner and closer to the passenger side upper corner. As such, it is well situated to handle the remnant of the A and B required wipe areas that primary blade 28 does not reach. Unlike center mounted single wiper systems, the invention creates an asymmetric, weighted more toward one side, wipe pattern that is more efficiently matched to the required wipe areas.

Variations in the preferred embodiment could be made. The driver side and passenger side designations are in some sense arbitrary. For example, they would be switched in the UK, and the operative wiper post 20 would be consequently moved to the other side. The wiper 22 would be reversed, as well. Being mounted to one side or the other, rather than in the center, the wiper 22 can be easily retro-fitted to replace two wiper systems in vehicles of either hand drive. The designation of upper and lower edge of the windshield is also somewhat arbitrary. For example, the edge of the windshield contiguous to the roof might be considered the lower edge, not the upper, if one were viewing things from the back of the vehicle. Therefore, "lower edge" should not be read so narrowly as to require that the operative wiper post be journaled near the vehicle hood. It could be near the vehicle roof, theoretically. Some mechanical means other than the drag link could be used to pivot the secondary arm 30 about the primary arm 24, so long as it acted positively, and not passively, as windshield drag friction does. Therefore, it is not intended to limit the invention to just the disclosed embodiment.

The embodiments of the invention in which an exclusive property or privilege is claimed are defined as follows:

1. A single wiper system for use with a vehicle body having a substantially rectangular windshield with an upper edge, lower edge, and a pair of side edges intersecting said lower and upper edges at two lower corners and two upper corners, and in which said windshield presents a surface area that is relatively wider, as measured between its side edges, then it is long, as measured from upper to lower edge, and in which said windshield is curved sharply down from its center to said side edges, said single wiper system comprising, a wiper post journaled to said vehicle body at a location proximate one lower corner and adapted to oscillate back and forth over an angle substantially equal to the angle subtended by said one lower corner, a primary arm fixed to said wiper post so as to sweep back and forth therewith as said wiper post oscillates, an extension beam pinend near its center to the tip of said primary arm, a primary blade mounted near its center to the inboard end of said extension beam so as to provide a degree of freedom for said primary blade generally perpendicular to said windshield and so as to have an effective length substantially equal to a side edge of said windshield so as to cover a main wipe pattern having an inwipe position substantially parallel to said lower edge and an outwipe position substantially parallel to one said edge and reaching nearly into one upper corner while substantially missing the other lower and upper corner, a secondary arm, a bell crank attached to one end of said secondary arm and having one leg pivoted to the outboard end of said extension beam, a secondary blade mounted near its center to the tip of said secondary arm to as to have an effective length substantially equal to the length differential between said primary blade effective length and said windshield lower edge when said wiper is in said inwipe position, and, a drag link connected between said vehicle body and bell crank to pivot said secondary arm and blade continuously between an extended position substantially collinear to said primary blade when said primary blade is in its inwipe position and a retracted position substantially perpendicular to said primary blade when said primary blade is in its outwipe position, whereby, as said primary blade covers its main wipe pattern, said second blade simultaneously covers a supplemental wipe pattern that extends substantially into said other lower corner and closer to said other upper corner while missing said upper edge, while said wiper system conforms to said curved windshield by virtue of said extension beam.

* * * * *